United States Patent
Vartuli et al.

(10) Patent No.: US 6,811,760 B2
(45) Date of Patent: Nov. 2, 2004

(54) INORGANIC ACICULAR BODIES AND METHOD FOR PRODUCING SAME

(75) Inventors: James Scott Vartuli, Rexford, NY (US); Venkat Subramaniam Venkataramani, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 26 days.

(21) Appl. No.: 09/681,405

(22) Filed: Mar. 30, 2001

(65) Prior Publication Data

US 2002/0141926 A1 Oct. 3, 2002

(51) Int. Cl.$^7$ .......................... C01F 17/00; C01G 15/00
(52) U.S. Cl. ........................ 423/263; 423/624
(58) Field of Search .............................. 423/263, 625, 423/624, 641, 642, 643; 501/152; 252/301.36, 301.4 R; 117/944, 945, 947

(56) References Cited

U.S. PATENT DOCUMENTS

| | | | | |
|---|---|---|---|---|
| 3,011,870 A | * | 12/1961 | Webb et al. ................. | 423/625 |
| 5,132,104 A | * | 7/1992 | Yamamoto et al. .......... | 423/622 |
| 5,468,697 A | * | 11/1995 | Yamaguchi et al. ......... | 423/412 |
| 5,496,528 A | * | 3/1996 | David et al. ................. | 423/263 |
| 5,686,368 A | * | 11/1997 | Wong .......................... | 501/152 |
| 5,820,843 A | * | 10/1998 | Yukinobu et al. ........... | 423/624 |
| 6,384,417 B1 | * | 5/2002 | Okumura et al. ............ | 250/367 |

FOREIGN PATENT DOCUMENTS

| JP | 53-25229 | * | 3/1978 |
|---|---|---|---|
| JP | 2000-171563 | * | 6/2000 |

OTHER PUBLICATIONS

Periodic Table of the Elements, no date.*

* cited by examiner

*Primary Examiner*—Steven Bos
(74) *Attorney, Agent, or Firm*—Toan P. Vo; Patrick K. Patnode

(57) ABSTRACT

Acicular bodies of a metal compound are produced by slowly precipitating an organic salt of the metal from a solution of an ester of a dicarboxylic acid having 1–5 carbon atoms and firing the precipitate in an oxidizing atmosphere. These acicular bodies have a cross-sectional dimension less than about 20 $\mu$m and are useful for providing reinforcement of a larger ceramic body. Acicular bodies of rare-earth metal oxides also are useful in reinforcing x-ray scintillator bodies without diminishing their luminescent capacity.

3 Claims, 4 Drawing Sheets

INORGANIC ACICULAR BODIES AND METHOD FOR PRODUCING SAME

BACKGROUND OF THE INVENTION

This invention relates to acicular bodies of inorganic materials and a method for producing the same. More particularly, this invention relates to micron-sized acicular bodies of metal oxides that are useful as reinforcements for ceramic composites and a method for producing the same. This invention also relates to composite materials having acicular bodies of metal oxides as reinforcements.

Shaped bodies of ceramics have found uses in many applications such as aeronautics, medical diagnostic systems, energy conversion, automotive components, and lighting. In some of these applications, the ceramic bodies are typically sintered shaped bodies that are resistant to deterioration in a harsh environment, such as high-temperature or corrosive environment. In other applications, such as in medical diagnostic systems, sintered bodies of certain ceramics, such as x-ray scintillators, are used for the unique properties of the chosen ceramic to luminesce upon being excited by a stimulating radiation. However, sintered ceramic bodies typically have smaller tensile stress than compression stress and are prone to cracking. To impart increased toughness and fracture resistance, these bodies are often reinforced with other inorganic fibers, such as metal carbide, boride, nitride, or oxide.

One common method for producing inorganic fibers is disclosed in U.S. Pat. No. 5,686,368. In this process a fibrous metal oxide product is made by providing an fiber template made of an organic material such as polyester, rayon, cellulose, etc.; soaking the fiber template to impregnate it with a rare-earth nitrate; drying the impregnated fiber; and heating the impregnated fiber to burn out the organic template and to convert the rare-earth metal nitrate to rare-earth metal oxide. The resulting product is a rare-earth metal oxide fiber having substantially the same shape and dimension as the organic fiber template.

U.S. Pat. No. 5,865,922 discloses a similar process for making ceramic fibers. In this process, fibers of a polymeric material are coated with silicon carbide or nitride vapor at a very high temperature to yield a partially rigid fibrous body. The coated fibers are infiltrated with an organic resin material, then pyrolyzed to produce fibers comprising porous carbon and silicon carbide or nitride. The porous fibers are then infiltrated with liquid silicon to react with the porous carbon to yield fiber predominantly composed of silicon carbide.

In another process disclosed in U.S. Pat. No. 6,120,840; a fibrous material is infiltrated with a polymer precursor of an organic transition metal complex. The polymer precursor is then cured and decomposed to convert the organic transition metal complex to a transition metal boride or carbide.

Although good inorganic fibers could be obtained from these processes, the manufacturing cost is undoubtedly high due to the use of possibly costly organic fiber raw materials and the complex multi-step nature of the processes.

Therefore, there is a need for a simple process for making inorganic fibers. It is also very desirable to produce inexpensive inorganic fibers without resorting to using organic fiber templates. Furthermore, in many instances, it is very desirable directly to produce inorganic fibers that have the same composition as the ceramic matrix in which they will reside.

SUMMARY OF INVENTION

The present invention provides inorganic acicular bodies comprising at least one inorganic compound of a metal selected from the group consisting of Groups IA, IB, IIA, IIB, IIIA, IIIB, IVA, IVB, VA, VB, VIA, VIB, VIIA, VIIB, VIIIA, rare-earth metals of the Periodic Table, and mixtures thereof. These acicular bodies may be used in reinforcement of composite ceramic bodies. The inorganic acicular bodies may be produced directly to have the same composition as the ceramic bodies. More particular, the inorganic acicular bodies comprise metal oxides and have a cross-sectional dimension of less than about 20 $\mu$m. The inorganic acicular bodies are characterized in that their cross section is generally polygonal and their lengths are much longer than their cross-sectional dimension.

According to one aspect of the present invention, the inorganic acicular bodies are produced by a method comprising the steps of: preparing a solution of a precursor of the inorganic material; adding the solution of the inorganic material into a solution of an ester of a dicarboxylic acid; precipitating an organic salt of the ester of the dicarboxylic acid comprising the inorganic material (hereinafter called the organic salt) in acicular shape; separating the acicular-shaped bodies of the organic salt; drying the acicular-shaped bodies of the organic salt; and firing the acicular-shaped organic salt in an oxidizing atmosphere to produce inorganic acicular bodies.

Other aspects, advantages, and salient features of the present invention will become apparent from a perusal of the following detailed description, which, when taken in conjunction with the accompanying figures, discloses embodiments of the present invention.

DETAILED DESCRIPTION

Figure 1:
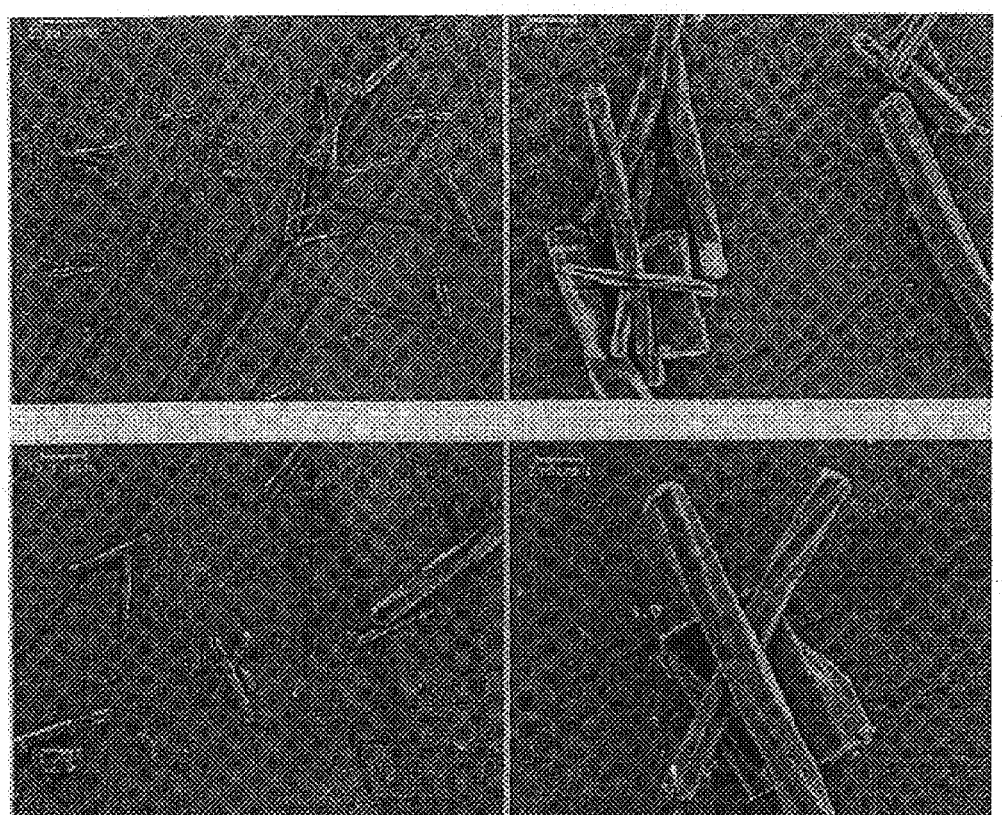
FIG. 1 is a scanning electron microscopy (SEM) photograph of acicular bodies of precipitate of yttrium gadolinium oxalate from dimethyl oxalate solution.
Figure 2:
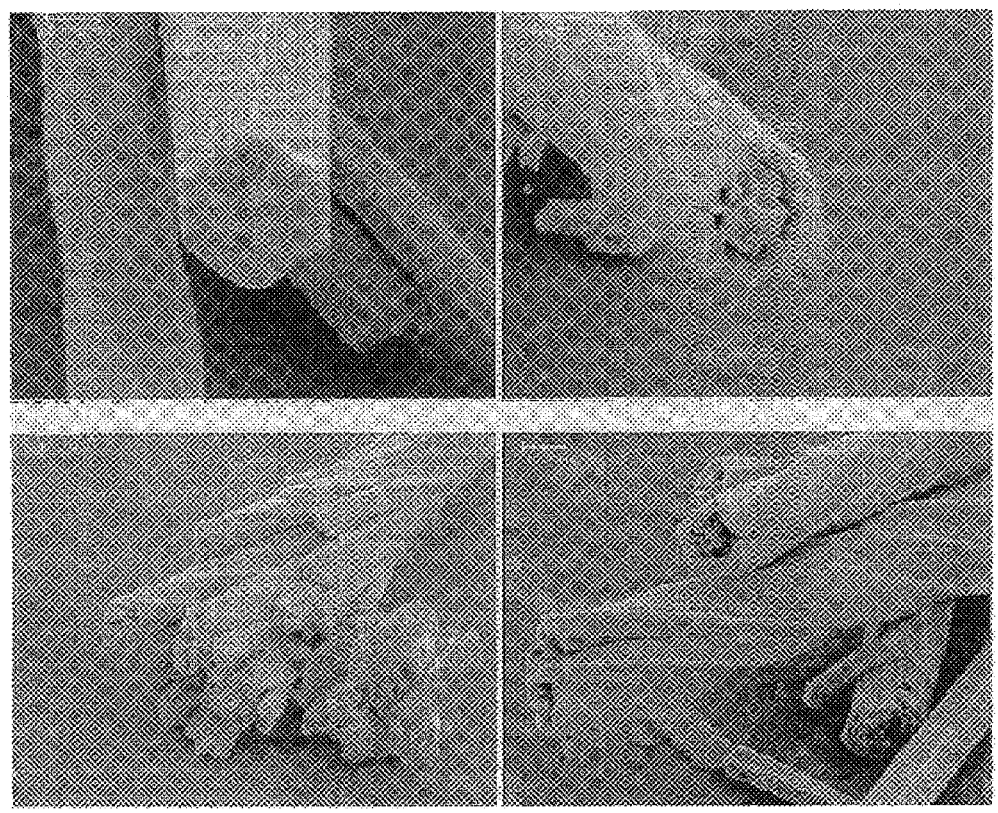
FIG. 2 is a SEM photograph of acicular bodies of yttrium gadolinium oxide after firing.
Figure 3:
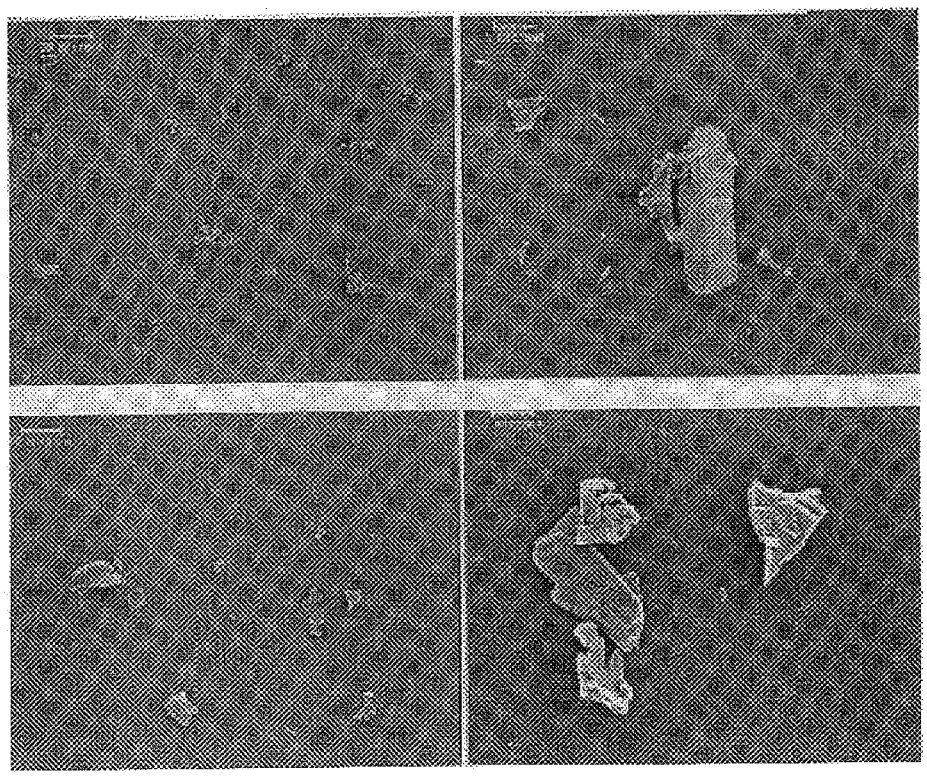
FIG. 3 is SEM photograph of acicular bodies of precipitate of yttrium gadolinium oxalate from diethyl oxalate solution.
Figure 4:
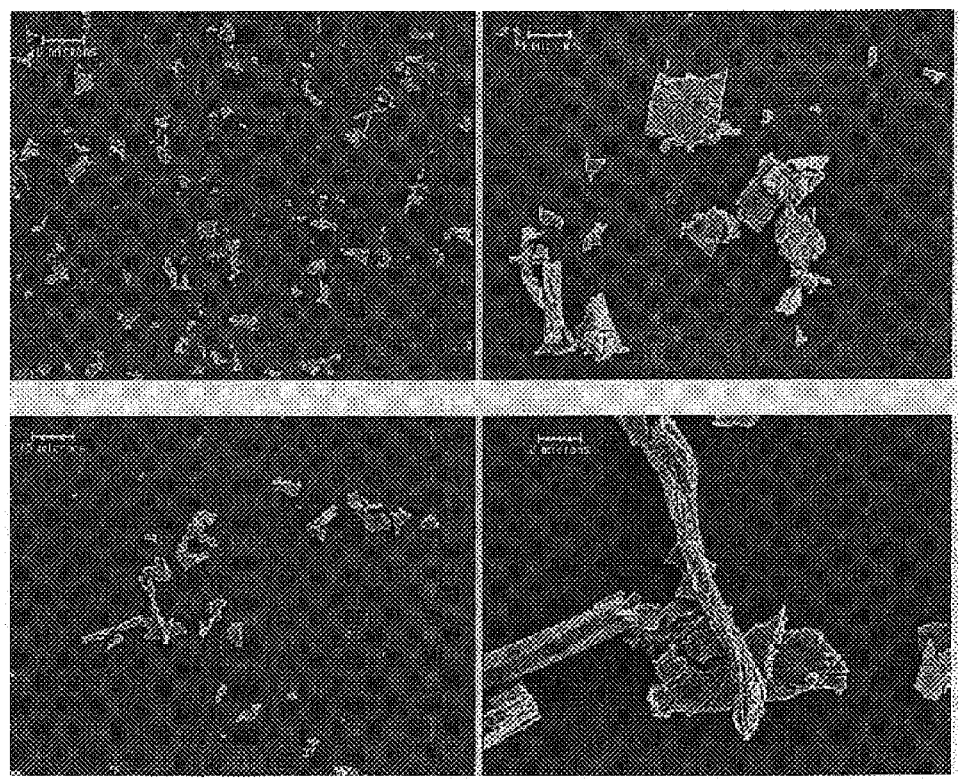
FIG. 4 is an x-ray diffraction pattern of the yttrium gadolinium oxide powder from fired acicular bodies of the present invention indicating the $Gd_{0.745}Y_{1.255}O_3$ composition.

The present invention provides a simple method for producing inorganic acicular bodies or fibers that may be used as reinforcements in larger composite ceramic bodies comprising a ceramic matrix having these acicular bodies embedded therein. The acicular bodies of the present invention comprise crystals of a compound of a metal present in the inorganic precursor material. The method of the present invention is suitable for producing acicular bodies comprising compounds of one or more metals selected from Groups IA, IB, IIA, IIB, IIIA, IIIB, IVA, IVB, VA, VB, VIA, VIB, VIIA, VIIB, VIIIA, and the rare-earth metals of the Periodic Table. The method of the present invention is particularly suitable for producing acicular bodies of oxides of metals of Groups IIA, IIIA, IIB of the Periodic table, and oxides of rare earth metals. The method of the present invention is more particularly suitable for producing acicular bodies of oxides of scandium, yttrium, lanthanum, aluminum, gallium, indium, thallium, cesium, praseodymium, neodymium, europium, gadolinium, terbium, dysprosium, holmium, erbium, thulium, ytterbium, lutetium, and mixtures thereof.

For example, acicular bodies of yittrium gadolinium oxide of the present invention may be produced and incorporated in a europium-or praseodymium-doped yittrium gadolinium oxide (($Y,Gd)_2O_3$) x-ray scintillator to provide reinforcing strength to shaped bodies of the scintillator. Since the acicular bodies fibers of the present invention may be made to have the same composition as that of the scintillator bodies, the luminescence capacity of these scintillators is not diminished when these fibers are incorporated into the scintillator bodies, as would be with other types of fibers. When the composition of the acicular bodies is the same as that of the ceramic bodies in which they reside, another benefit may be realized in that a stronger bond may develop between the two phases because of their compatibility.

The inorganic acicular bodies of the present invention are produced by a method comprising the steps of: (1) preparing a solution of a precursor of the inorganic material; (2) adding the solution of the inorganic material into a solution of an ester of a dicarboxylic acid; (3) precipitating an organic salt of the ester of the dicarboxylic acid (the organic salt) in acicular-shaped bodies; (3) separating the acicular-shaped bodies of the organic salt; (4) drying the acicular-shaped bodies of the organic salt; and (5) firing the acicular-shape bodies of the organic salt in an oxidizing atmosphere at a temperature and for a time sufficient to convert the organic salt to inorganic acicular bodies. The production of inorganic acicular bodies from this process was an unexpected result of the reaction of an ester of a dicarboxylic acid and an inorganic metal salt.

The solution of the precursor inorganic material may be an aqueous solution of a water-soluble inorganic precursor material or an acidic solution of the same when the solubilization of such precursor in the solution need be enhanced. In some instances, an amount of a polar solvent, such as a low-molecular weight alcohol having 1–3 carbon atoms, may be added into the solution to enhance the solubilization, as would be recognized by a person skilled in the art. Any acid that is capable of dissolving the chosen inorganic precursor may be used to produce the acid solution. For example, hydrochloric acid, nitric acid, sulfuric acid, citric acid, or acetic acid may be used. The choice of acid is determined by the solubility limit of the inorganic precursor in the acid. Typically, the concentration of the inorganic precursor material in the final acid solution is far from its solubility limit.

Esters of dicarboxylic acids that may be used in the present invention are methyl, ethyl, propyl, dimethyl, diethyl, and dipropyl esters. Examples of dicarboxylic acids that may be used to form an ester for the process of the present invention are oxalic acid, malonic acid, succinic acid, and glutaric acid. The preferred esters are dimethyl and diethyl oxalate. The aqueous or acidic solution of inorganic precursor is slowly added into the dicarboxylic acid ester solution while stirring. The size of the acicular bodies may be influenced by the rate of addition of the solution. For example, it has been known that the growth of large crystals is promoted by slow nucleation of the crystals. Therefore, a slower addition of the acid solution into the dicarboxylic acid ester solution may promote the formation of larger acicular bodies.

The precipitated, separated, and dried acicular bodies of the organic salt are fired in an oxidizing atmosphere, such as air, oxygen, carbon dioxide, mixtures of oxygen and one or more inert gases selected from the group consisting of helium, neon, argon, krypton, and xenon, or mixture thereof, at a temperature and for a time sufficient to decompose the dicarboxylic acid ester. A temperature from about 400 to about 1400° C. is sufficient for this purpose. Preferably, the precipitate is fired at a temperature from about 700° C. to about 1000° C. The firing may be conveniently done in a batch-wise or continuous process. The firing time is determined by the quantity of precipitate to be fired, the amount of oxidizing gas conducted through the firing equipment, and the gas-solid contact in the firing equipment. A firing time of about 2 to about 6 hours is adequate to convert all the oxalate to oxide.

EXAMPLE 1

An acidic solution of $Y_2O_3$ and $Gd_2O_3$ in nitric acid was prepared. The solution contained 5 g $Y_2O_3$, 4.0 g $Gd_2O_3$, 19.7 g concentrated $HNO_3$ solution (about 69.5 weight percent acid), and 37.1 g deionized water. The solution was stirred until all the oxides were visibly dissolved.

A dimethyl oxalate solution was prepared by adding and dissolving 22.3 g dimethyl oxalate in 345 g of deionized water. The yittrium gadolinium oxide acidic solution was added drop-wise into the oxalate solution while stirring with a magnetic stirring bar. An amount of 600 g of deionized water was added to the oxalate solution immediately after all the acidic solution was added. Visible precipitate appeared in about 2–4 hours. The solution was decanted and the precipitate was washed with eight 1000-ml portions of deionized water. After the eighth wash, the pH of the wash water was about 6.

The precipitate was filtered, dried overnight in an oven at 105° C., and then fired in air in a furnace at 750° C. for 4 hours. Alternatively, the drying may be carried out at any temperature above the boiling point of the solvent of the solution. The fired precipitate was analyzed using SEM and x-ray diffraction, showing that the precipitate were of acicular shape having generally a polygonal cross section, a cross-sectional dimension of less than about 2 $\mu$m, and a composition of $Gd_{0.745}Y_{1.255}O_3$.

EXAMPLE 2

The same procedure was repeated except 27.62 g of diethyl oxalate was used in place of dimethyl oxalate. Visible precipitate appeared after about 8 hours. The fired precipitate showed a mixture of acicular and plate-like bodies.

EXAMPLE 3

The same procedure as in Example 1 was repeated except 38.23 g of dibutyl oxalate was used in place of dimethyl oxalate. No powder precipitate was obtained in 5 days. Instead, the precipitate consisted of large clumps.

In another embodiment of the present invention, acicular bodies of mixed rare-earth and Group III metal oxides may be produced by the method of the present invention to be used as reinforcements for sintered shaped bodies of x-ray scintillators used in, for example, computed tomography scanning systems. Examples of such oxides, beside yittrium gadolinium oxide, are gadolinium gallium oxide, gadolinium scandium gallium oxide, lutetium aluminum oxide, yittrium gallium oxide. These oxides may be doped with one or more rare earth metals of the lanthanum series, such as praseodymium, europium, ytterbium, samarium, or neodymium, as needed by providing a compound of the chosen metal in the mixture of the inorganic precursor material so that the composition of the final acicular bodies is the same as that of the scintillator.

In still another embodiment of the present invention, the acicular bodies have the alumina composition and are used to reinforce sintered polycrystalline alumina or silicon carbide bodies that find wide applications in lighting systems or high-speed rotating machinery.

In one preferred embodiment, a low-melting inorganic matrix containing acicular bodies is extruded to produce a composite material comprising fiber bundles having a preferred alignment. Such a composite material may be useful in optical applications While various embodiments are described herein, it will be appreciated from the specification that various combinations of elements, variations, equivalents, or improvements therein may be made by those skilled in the art, and are still within the scope of the invention as defined in the appended claims.

What is claimed is:

1. An acicular body comprising at least one oxide of at least one metal selected from the group consisting of gallium, thallium, rare earth metals, and mixtures thereof; said acicular body having a polygonal cross section and a cross-sectional dimension less than about 20 $\mu$m.

2. An acicular body comprising at least one oxide of at least one metal selected from the group consisting of scandium, yttrium, lanthanum, thallium, cesium, praseodymium, neodymium, europium, gadolinium, terbium, dysprosium, holmium, erbium, thulium, ytterbium, lutetium, and mixtures thereof; said acicular body having a polygonal cross section and a cross-sectional dimension less than about 20 $\mu$m.

3. An acicular body comprising at least one oxide of a rare earth metal; said acicular body having a polygonal cross section and a cross-sectional dimension less than about 20 $\mu$m.

* * * * *